United States Patent
Awad et al.

(10) Patent No.: US 9,871,928 B2
(45) Date of Patent: Jan. 16, 2018

(54) PERSONALIZED INTERACTIVE VOICE RESPONSE SYSTEM

(71) Applicant: AT&T INTELLECTUAL PROPERTY I, L.P., Atlanta, GA (US)

(72) Inventors: Mina Awad, Edison, NJ (US); John T. McSweeney, Hillsborough, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 126 days.

(21) Appl. No.: 15/152,074

(22) Filed: May 11, 2016

(65) Prior Publication Data

US 2016/0255200 A1 Sep. 1, 2016

Related U.S. Application Data

(63) Continuation of application No. 14/337,349, filed on Jul. 22, 2014, now Pat. No. 9,369,579, which is a continuation of application No. 13/370,905, filed on Feb. 10, 2012, now Pat. No. 8,798,240, which is a continuation of application No. 12/337,954, filed on Dec. 18, 2008, now Pat. No. 8,139,727.

(51) Int. Cl.
| | |
|---|---|
| *H04M 11/00* | (2006.01) |
| *H04M 3/527* | (2006.01) |
| *H04M 3/493* | (2006.01) |
| *H04M 3/51* | (2006.01) |
| *H04M 3/42* | (2006.01) |

(52) U.S. Cl.
CPC ....... *H04M 3/527* (2013.01); *H04M 3/42068* (2013.01); *H04M 3/493* (2013.01); *H04M 3/5166* (2013.01); *H04M 3/42059* (2013.01)

(58) Field of Classification Search
CPC .................................................... H04M 3/527
See application file for complete search history.

(56) References Cited

U.S. PATENT DOCUMENTS

| | | | |
|---|---|---|---|
| 5,737,393 A | 4/1998 | Wolf | |
| 5,933,484 A | 8/1999 | Partridge, III | |
| 6,061,433 A * | 5/2000 | Polcyn ................. | H04M 3/493 |
| | | | 379/207.15 |
| 6,459,776 B1 * | 10/2002 | Aktas ................. | H04M 3/5307 |
| | | | 379/88.13 |

(Continued)

*Primary Examiner* — Joseph T Phan
(74) *Attorney, Agent, or Firm* — Greenblum & Bernstein, P.L.C.

(57) ABSTRACT

An interactive voice response method permits an intelligent interactive voice system to communicate with a caller. The method includes determining that a caller is a first time caller, interactively communicating with the first time caller, and routing a call to a particular destination based upon information received from the caller. The method also includes establishing a caller personal profile based on the information received from the first time caller, developing a predictive personalized interactive communication dialog for a repeat call by the first time caller, and storing the caller personal profile and the predictive personalized interactive communication dialog. The method further includes updating the predictive personalized interactive communication dialog based on information obtained by the repeat call by the first time caller.

17 Claims, 4 Drawing Sheets

(56) References Cited

U.S. PATENT DOCUMENTS

| | | | |
|---|---|---|---|
| 6,487,277 B2* | 11/2002 | Beyda | H04M 3/493 379/72 |
| 7,065,188 B1* | 6/2006 | Mei | G10L 15/22 379/76 |
| 7,127,232 B2 | 10/2006 | O'Neil et al. | |
| 7,272,212 B2 | 9/2007 | Eberle et al. | |
| 7,386,103 B1 | 6/2008 | Charhal | |
| 7,457,395 B2* | 11/2008 | Creamer | H04M 3/2227 379/88.01 |
| 7,515,695 B1* | 4/2009 | Chan | H04M 3/493 379/221.09 |
| 7,558,380 B2 | 7/2009 | DiVenuta et al. | |
| 7,920,682 B2 | 4/2011 | Byrne et al. | |
| 8,094,788 B1* | 1/2012 | Eberle | G06Q 10/10 379/88.12 |
| 8,798,256 B2* | 8/2014 | Wawrzynowicz | H04M 3/5166 379/265.01 |
| 9,218,410 B2* | 12/2015 | Gray | G06F 17/30598 |
| 9,635,067 B2* | 4/2017 | Hibbard | H04L 65/1083 |
| 2010/0020952 A1 | 1/2010 | Leung et al. | |

* cited by examiner

FIGURE 4

PERSONALIZED INTERACTIVE VOICE RESPONSE SYSTEM

CROSS REFERENCE

This application is a continuation of pending U.S. patent application Ser. No. 14/337,349, filed on Jul. 22, 2014, which is a continuation of U.S. patent application Ser. No. 13/370,905, filed on Feb. 10, 2012, now U.S. Pat. No. 8,798,240, which is a continuation of U.S. patent application Ser. No. 12/337,954, filed Dec. 18, 2008, now U.S. Pat. No. 8,139,727, the disclosures of which are incorporated by reference herein in their entireties.

BACKGROUND

1. Field of the Disclosure

The present disclosure relates to the field of communications. More particularly, the present disclosure relates to a personalized interactive voice response method that establishes a personal profile of a caller from information gathered from the caller during an interactive communication with the caller, and develops a predictive personalized interactive communication dialog for future calls from the caller.

2. Background Information

Traditionally, interactive voice response (IVR) systems present a caller with many options from which to choose in order to determine to which destination to route the caller.

DETAILED DESCRIPTION

In view of the foregoing, the present disclosure, through one or more of its various aspects, embodiments and/or specific features or sub-components, is thus intended to bring out one or more of the advantages as specifically noted below.

According to an embodiment of the present disclosure, an interactive voice response method permits an intelligent interactive voice system to communicate with a caller. The method begins by receiving a call and connecting the caller with the intelligent interactive voice system. The method then identifies the caller from identification information associated with the caller and determines if the caller is a first time caller or a repeat caller. Based upon interactively communicating with the caller in accordance with an interactive script, the method routes the caller to a destination based upon caller information gathered from the caller during the interactive communication with the caller. The method then establishes a personal profile of the caller in the intelligent interactive voice system if the caller is a first time caller, the personal profile including information gathered from the caller during the interactive communication with the caller. Finally, the method develops a predictive personalized interactive communication dialog for future calls from the caller, based upon the information gathered from the caller during the interactive communication with the caller and stored in the caller's personal profile.

In another embodiment, the personal profile of the caller in the intelligent interactive voice system is updated if the caller is a repeat caller, the updating including information gathered from the caller during the interactive communication with the caller.

In a further embodiment, the personal profile of the caller is stored in a caller database and includes the caller's name, at least one phone number, and other information gathered from the caller during interactive communications with the caller.

In an embodiment, the predictive personalized interactive communications dialog with the caller begins with the intelligent interactive voice system addressing the caller by the caller's name as determined with reference to the personal profile of the caller.

In another embodiment, the predictive personalized interactive communication dialog with the caller is based upon intelligently predicting the most probable purpose of the call by analyzing a history of information previously gathered from the caller during previous calls.

In a further embodiment, the predictive personalized interactive communication dialog with the caller is based upon the history of information previously gathered from the caller during a selectable number of previous calls, the selectable number being variably determined by the intelligent interactive voice system based upon information included in the profile of the caller.

In an embodiment, the predictive personalized interactive communication dialog with the caller is based upon the history of information previously gathered from the caller during a selectable time frame of previous calls, the selectable time frame being variably determined by the intelligent interactive voice system based upon information included in the profile of the caller.

In another embodiment, the predictive personalized interactive communication dialog with the caller continues to develop a more complex structure over time as multiple paths containing various pluralities of predetermined questions are developed and stored in a caller's profile.

In a further embodiment, the predictive personalized interactive communication dialog with the caller is based upon predicting that the caller is calling about a specific business account.

In an embodiment, the predictive personalized interactive communication dialog with the caller is based upon predicting that the caller is calling about a specific issue regarding the specific business account.

In another embodiment, the personal profile of the caller may be self-customized by the caller to include personal preferences set by the caller that affects the predictive personalized interactive communication dialog.

In a further embodiment, the personal profile of the caller may be self-customized by the caller to include special security code words to identify one or more account numbers of the caller.

In an embodiment, the personal profile of the caller may be self-customized by the caller to include special short-cut code words to expedite routing of the caller to one or more desired destinations.

In another embodiment, the personal profile of the caller may be self-customized by the caller to include personal preferences set by the caller that affects the predictive personalized interactive communication dialog, the personal preferences set by the caller being characterized as persistent parameters that do not change unless personally changed by the caller.

In a further embodiment, a computer readable medium stores a computer program that permits an intelligent interactive voice system to communicate with a caller. The medium includes a connecting segment that receives a call and connects a caller with the intelligent interactive voice system, and an indentifying segment that identifies the caller from identification information associated with the caller. The medium also includes a determining segment that determines if the caller is a first time caller or a repeat caller, a communicating segment that interactively communicates with the caller in accordance with an interactive script, and a routing segment that routs a caller to a destination based upon caller information gathered from the caller during the interactive communication with the caller. The medium further includes an establishing segment that establishes a personal profile of the caller in the intelligent interactive voice system if the caller is a first time caller, the personal profile including information gathered from the caller during the interactive communication with the caller, and a developing segment that develops a predictive personalized interactive communication dialog for future calls from the caller, based upon the information gathered from the caller during the interactive communication with the caller and stored in the caller's personal profile.

In an embodiment, a computer system executes a computer program that permits an intelligent interactive voice system to communicate with a caller. The system includes a receiver that receives a call and connects a caller with the intelligent interactive voice system, and an identifier that identifies the caller from identification information associated with the caller. The system also includes a determiner that determines if the caller is a first time caller or a repeat caller, a communicator that communicates with the caller in accordance with an interactive script, and a router that routes a caller to a destination based upon caller information gathered from the caller during the interactive communication with the caller. The system further includes an establisher that establishes a personal profile of the caller in a memory of the intelligent interactive voice system if the caller is a first time caller, the personal profile including information gathered from the caller during the interactive communication with the caller, and a developer that develops a predictive personalized interactive communication dialog for future calls from the caller, based upon the information gathered from the caller during the interactive communication with the caller and stored in the caller's personal profile.

Figure 1:
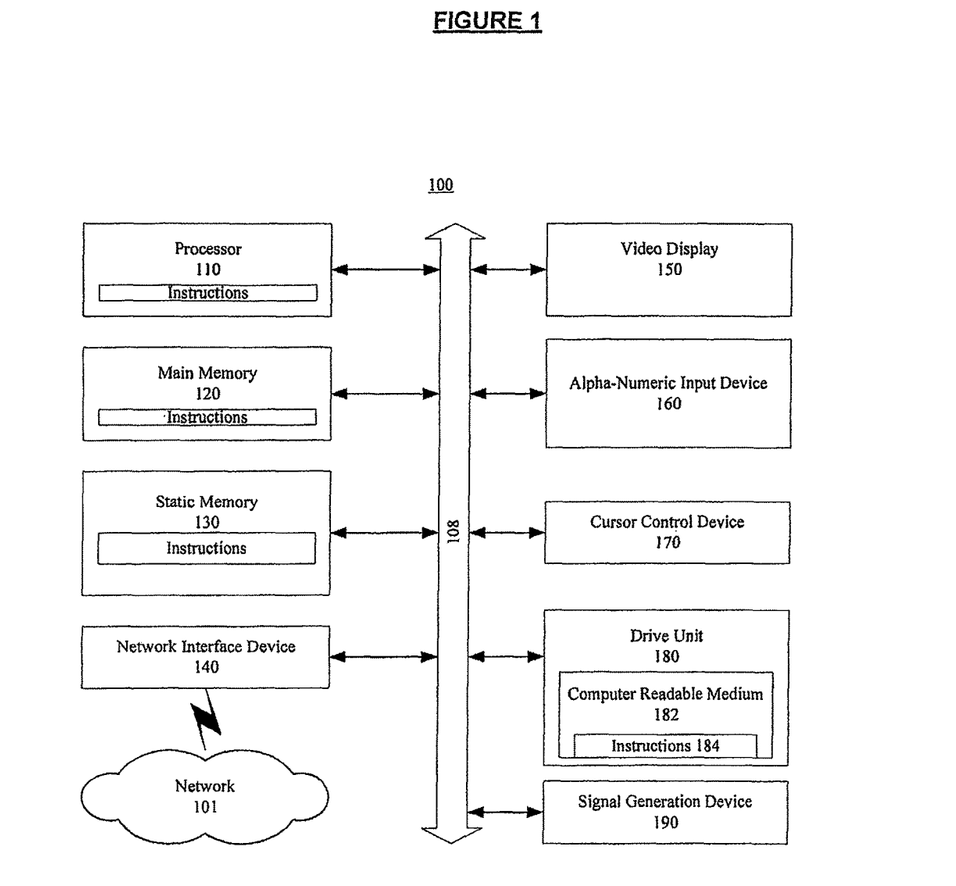
FIG. 1 shows an exemplary general computer system.

FIG. 1 is an illustrative embodiment of a general computer system, on which an interactive voice response method that permits an intelligent voice system to communicate with a caller can be implemented, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a global positioning satellite (GPS) device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

Figure 2:
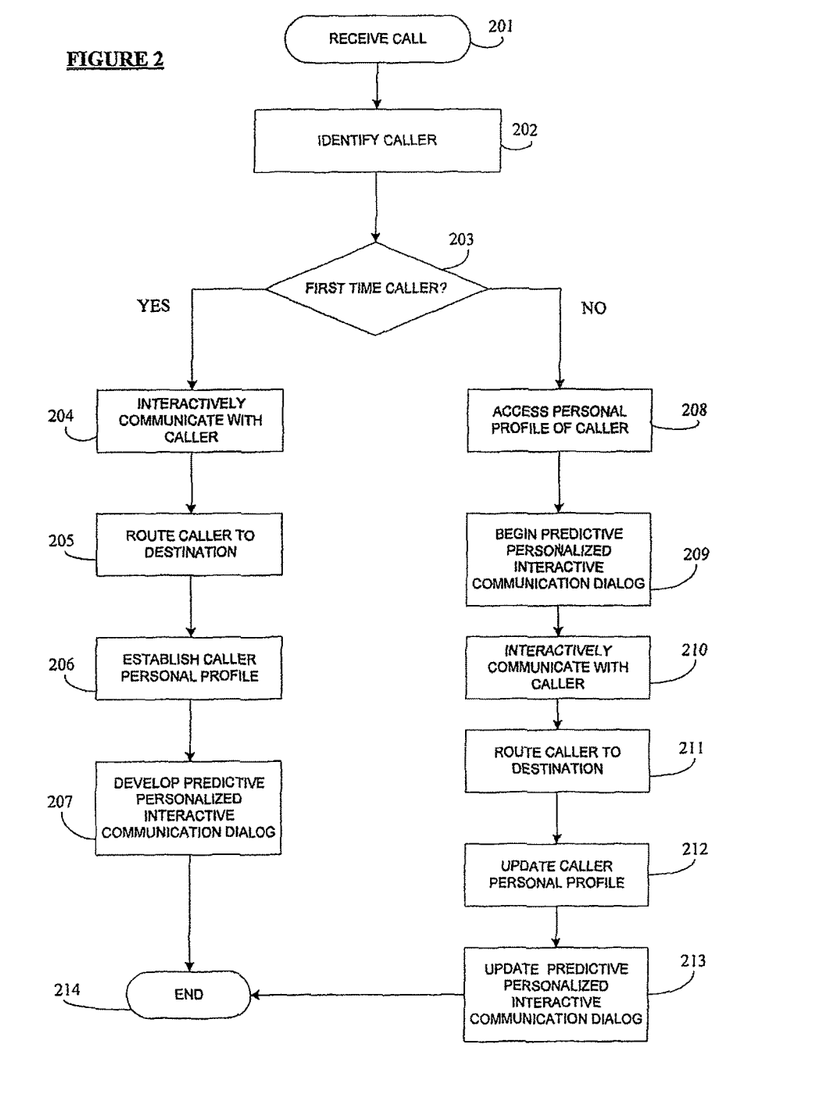
FIG. 2 is a flowchart depicting an exemplary personalized interactive voice response process, according to an aspect of the present disclosure.

FIG. 2 is a flowchart depicting an exemplary personalized interactive voice response process, according to an aspect of the present disclosure. In the flowchart, the method starts when the intelligent interactive voice system receives a call 201 and is connected with the caller. The caller is then identified 202 from the identification information associated with the caller. At this time, a determination 203 is made whether the caller is a first time caller or a repeat caller. If the caller is a first time caller, then the intelligent interactive voice system interactively communicates with the caller 204. Based upon caller information gathered from the caller during the interactive communication, the caller is routed to an appropriate destination 205. Then, the intelligent interactive voice system establishes a personal profile 206 of the caller in the system that includes information gathered from the caller during the interactive communication. Based upon the caller's personal profile developed from information gathered from the caller, a predictive personalized interactive communication dialog is developed 207 and stored for use during future calls with the caller, which ends 214 this portion of the process.

Alternatively, if the caller is not a first time caller, but a repeat caller, then the caller's stored personal profile is accessed 208. At this point, the system begins the caller's developed predictive personalized interactive communication dialog 209, and interactively communicates with the caller 210. This personalized and interactive process results in a more pleasant and efficient routing of the caller to the desired destination 211. The repeat caller's profile is then updated 211 based upon the most recent call. The repeat caller's predictive personalized interactive communications dialog is also updated 213, which concludes this portion of the process 214.

In the intelligent interactive voice system, a caller's personal profile is stored in a caller database and includes the caller's name and phone number. The system may include multiple phone numbers for the caller, such as an office phone number, a home phone number, an office cell phone number, and a personal cell phone number. The system may also store other information gathered from the caller during the interactive communications, such as the caller's address, account numbers, and personal preferences. The system may also begin the personalized interactive communications dialog by addressing the caller by their name as determined with reference to the caller's personal profile. The name used may be the formal name of the caller, or an informal name such as a nickname.

The predictive personalized interactive communication dialog with the caller is based upon intelligently predicting the most probable purpose of the call, by analyzing a history of information previously gathered from the caller during previous calls. The history of information used may include all calls, or be limited to a selectable number of previous calls. The selectable number of previous calls may be variably determined by the intelligent interactive voice system based upon information included in the profile of the caller. Alternatively, the history of information used may be limited to the information previously gathered from the caller during a selectable time frame of previous calls, with the selectable time frame being variably determined by the intelligent interactive voice system based upon information included in the profile of the caller.

Over time, as more calls are received from a caller, the predictive personalized interactive communication dialog with the caller continues to develop a more complex structure as multiple paths containing various predetermined questions are developed and stored in the caller's profile. The predictive personalized interactive communication dialog with the caller may be based on predicting that the caller is calling about a specific business account, or a specific issue regarding a specific business account.

Another feature of the system is that the personal profile of the caller may be self-customized by the caller to include personal preferences set by the caller that affects the predictive personalized interactive communications dialog. For instance, the caller may self-customize the caller's personal profile to include special security code words to identify one or more account numbers of the caller, or to include special short-cut words to expedite the routing of the caller to one or more desired destinations. Further, the caller may set certain personal preferences as persistent parameters that do not change unless the caller personally changes them. The special security code words, special short-cuts, and personal preferences are saved in the caller's personal profile.

Figure 3:
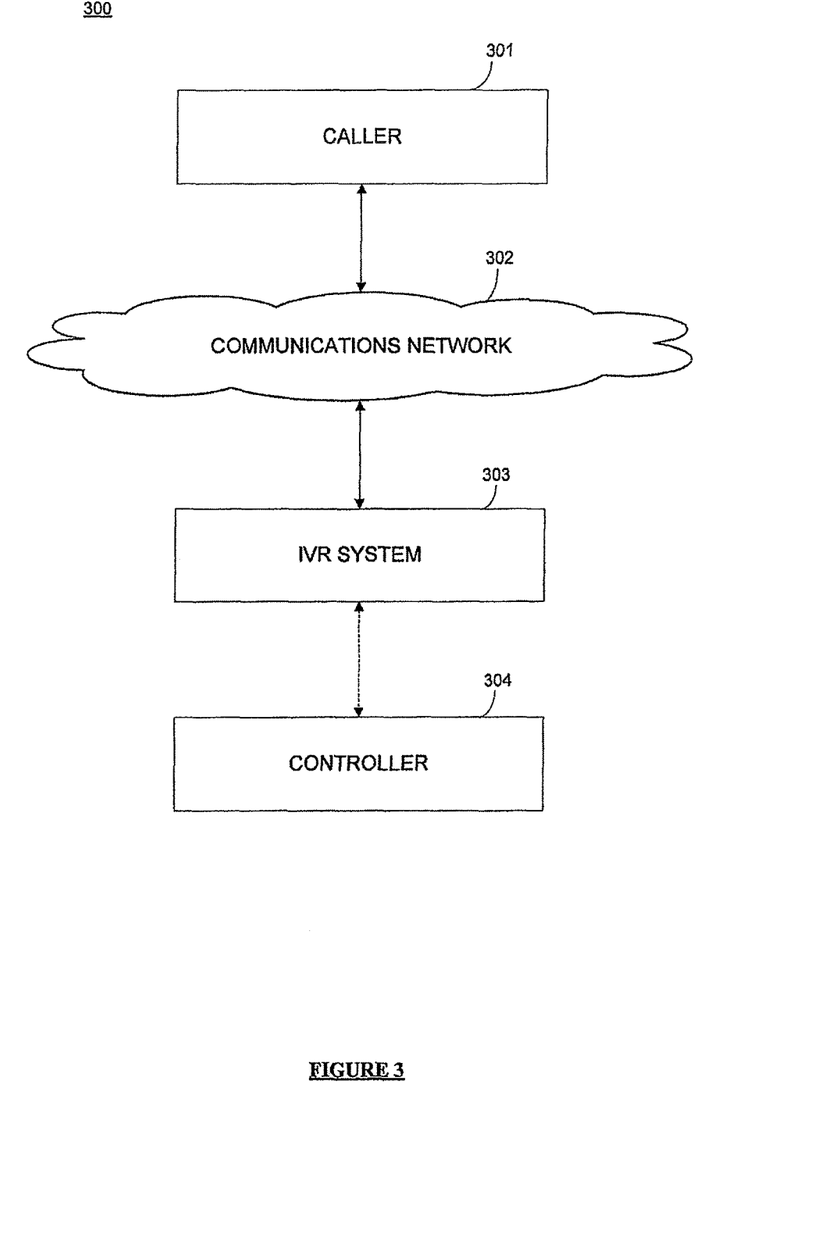
FIG. 3 shows a network including an IVR system and a controller.

FIG. 3 shows a network including an IVR system and a controller. The network 300 illustrates that a caller 301 communicates through a communications network 302. The caller 301 is connected to the IVR system 303, which interacts with the controller 304. The various functions of the intelligent interactive voice system may be performed by the IVR system 303, by the controller 304, or by a combination of the IVR system 303 and the controller 304 working together. Additionally, the caller may communicate using any one of many types of calling devices and communications networks 302. These devices may include a land-line telephone, a wireless phone, a personal digital assistant, Voice over Internet Protocol, etc.

Figure 4:
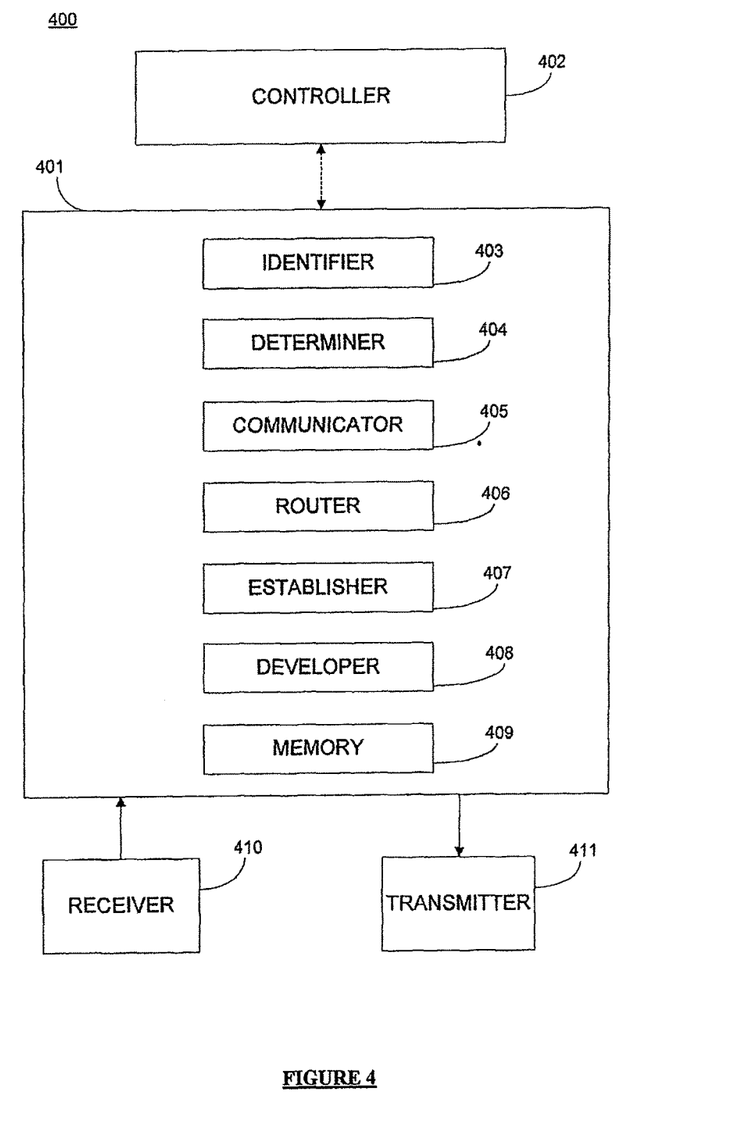
FIG. 4 shows a computer system including the IVR system components.

FIG. 4 shows a computer system including the IVR system components. The computer system 400 includes a controller 402 that interacts with the IVR system 401 in performing the various functions of the intelligent interactive voice system. The computer system 400 includes a receiver 410 that receives a call from a caller and connects the caller with the IVR system 401. The IVR system 401 includes an identifier 403 that identifies the caller from identification information associated with the caller. The determiner 404 determines if the caller is a first time caller or a repeat caller. The communicator 405 communicates with the caller via the receiver 410 and transmitter 411 in accordance with an interactive script with the caller. Based upon caller information that is gathered from the caller during the interactive communications with the caller, the router 406 routes the caller to a specific destination.

If the caller is a first time caller, the establisher 407 establishes a personal profile of the caller in the memory 409 of the intelligent interactive voice system. The established personal profile of the caller includes information gathered from the caller during the interactive communication with the caller. Based upon the information gathered from the caller during the interactive communication with the caller and stored in the caller's personal profile, the developer 408 develops a predictive personalized interactive communication dialog to be used in during future calls with the caller.

When the determiner 404 determines that the caller is a repeat caller, the personal profile of the caller is updated with information gathered from the caller during the interactive communication with the caller.

When the establisher 407 establishes the personal profile of a first time caller in the memory 409, the personal profile of the caller is stored in a caller database. The caller's personal profile that is stored in the caller database includes information gathered from the caller during the interactive communications with the caller, including at least the caller's name and one phone number.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, the interactive voice response method may be implemented using various forms of communication including telephone land lines, cell phones, voice over Internet protocol, and video calls.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other packed switched network transmission (e.g., VoIP, VoiceXML, SALT, SRGS, SISR, SSML, PLS, CCXML) represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method, comprising:
   determining that a caller is a first time caller;
   interactively communicating, by an intelligent interactive voice system, with the first time caller;
   routing a call to a particular destination based on information received from the first time caller by the intelligent interactive voice system;
   establishing a caller personal profile, by the intelligent interactive voice system, based on the information received from the first time caller;
   developing, by the intelligent interactive voice system, a predictive personalized interactive communication dialog for a repeat call by the first time caller;
   storing, in a storage, the caller personal profile and the predictive personalized interactive communication dialog, and updating the predictive personalized interactive communication dialog based on information obtained by one of (1) a selective time frame of previous calls by a repeat caller, and (2) a selective number of the previous calls by the repeat caller, wherein the selective time frame of the previous calls and the selective number of the previous calls are variably determined by the intelligent interactive voice system based on information stored in the caller personal profile, including whether the repeat caller is calling from one of an office phone, a home phone, and a cell phone.

2. The method of claim 1, further comprising:
developing and storing a plurality of predictive personalized interactive communication dialogs based upon different predictive purposes of the repeat call by the first time caller.

3. The method of claim 2, further comprising:
accessing the caller personal profile, and selecting a particular predictive personalized interactive communication dialog from the plurality of predictive personalized interactive communication dialogs for communicating with the caller, when the caller is determined to be a repeat caller.

4. The method of claim 3, wherein selecting the particular predictive personalized interactive communication dialog from the plurality of predictive personalized interactive communication dialogs comprises:
determining a purpose of a call by the repeat caller; and
selecting the particular predictive personalized interactive communication dialog for communicating with the repeat caller based on the purpose of the call.

5. The method of claim 3, wherein determining the purpose of the call by the repeat caller comprises:
intelligently predicting a most probable purpose of the call by the repeat caller by analyzing a stored history of information gathered from the repeat caller during previous calls; and
communicating with the repeat caller using the particular predictive personalized interactive communication dialog that corresponds to the most probable purpose of the call by the repeat caller.

6. The method of claim 5,
wherein the stored history of information includes information from all of the previous calls by the repeat caller, which is used to update the caller personal profile and the plurality of predictive personalized interactive communication dialogs.

7. The method of claim 5, further comprising:
updating the plurality of predictive personalized interactive communication dialogs based on information from a selective number of the previous calls by the repeat caller.

8. The method of claim 1,
wherein the caller personal profile is self-customized by a caller to establish persistent parameters that only the caller can change.

9. The method of claim 8,
wherein the persistent parameters established by the caller are used in developing the predictive personalized interactive communication dialog.

10. The method of claim 8,
wherein the persistent parameters established by the caller are used to expedite routing calls to different destinations.

11. The method of claim 9,
wherein the persistent parameters established by the caller are used to personalize the predictive personalized interactive communication dialog to caller preferences.

12. The method of claim 1,
wherein the personal profile of the first time caller is stored in a caller database and includes a variable parameter generated by the intelligent interactive voice system based on an initial call and a repeat call from the first time caller, and includes a persistent parameter established by the first time caller during the initial call or the repeat call that cannot be changed by the intelligent interactive voice system.

13. The method of claim 12,
wherein the variable parameter generated by the intelligent interactive voice system is updated after each repeat call by the first time caller.

14. The method of claim 13,
wherein the persistent parameter established by the caller remains constant, unless changed by the first time caller during a repeat call.

15. The method of claim 1,
wherein the predictive personalized interactive communication dialog develops an increasingly complex dialog structure having multiple paths as a total number of repeat calls from the first time caller increases.

16. An interactive voice response system that permits an intelligent interactive voice system to communicate with a caller, comprising:
a receiver that receives information from a caller during an initial call and during a repeat call;
a transmitter that transmits information to a caller during the initial call and the repeat call;
a router that routs a call to a particular destination based on information received from the caller;
a processor and a memory storing instructions that, when executed by the processor, cause the processor to perform operations comprising: determining whether the caller is a first time caller or a repeat caller, establishing a caller personal profile based on information received from the caller, developing a predictive personalized interactive communication dialog for a repeat call by the caller, and updating the predictive personalized interactive communication dialog based on information obtained by one of (1) a selective time frame of previous calls by a repeat caller, and (2) a selective number of the previous calls by the repeat caller,
wherein the selective time frame of the previous calls and the selective number of the previous calls are variably determined by the intelligent interactive voice system based on information stored in the caller personal profile, including whether the repeat caller is calling from one of an office phone, a home phone, and a cell phone; and
a storage that stores the caller personal profile and the predictive personalized interactive communication dialog.

17. A tangible computer-readable storage medium encoded with an executable computer program for enabling an intelligent interactive voice system to communicate with a caller over a communication link and that, when executed by a processor, causes the processor to perform operations comprising:
determining whether a caller is a first time caller or a repeat caller;

interactively communicating, by the intelligent interactive voice system, with the first time caller;

routing the call to a particular destination based upon information received from the caller by the intelligent interactive voice system;

establishing a caller personal profile, by the intelligent interactive voice system, based on the information received from the caller;

developing, by the intelligent interactive voice system, a predictive personalized interactive communication dialog for a repeat call by the caller;

storing, in a storage, the caller personal profile and the predictive personalized interactive communication dialog, and updating the predictive personalized interactive communication dialog based on information obtained by one of (1) a selective time frame of previous calls by a repeat caller, and (2) a selective number of the previous calls by the repeat caller, wherein the selective time frame of the previous calls and the selective number of the previous calls are variably determined by the intelligent interactive voice system based on information stored in the caller personal profile, including whether the repeat caller is calling from one of an office phone, a home phone, and a cell phone.

* * * * *